United States Patent [19]

Keane

[11] 4,012,735

[45] Mar. 15, 1977

[54] DUAL MODE PATTERN GENERATOR

[75] Inventor: James M. Keane, Neconset, N.Y.

[73] Assignee: Systems Resources Corporation, Plainview, N.Y.

[22] Filed: Oct. 24, 1975

[21] Appl. No.: 625,648

[52] U.S. Cl. .......................... 340/324 AD; 315/383; 340/172.5

[51] Int. Cl.[2] .......................................... G06F 3/14

[58] Field of Search ............................ 340/324 AD

[56] References Cited

UNITED STATES PATENTS

| | | | |
|---|---|---|---|
| 2,987,715 | 6/1961 | Jones et al. | 340/324 AD |
| 3,109,166 | 10/1963 | Kronenberg et al. | 340/324 AD |
| 3,471,848 | 10/1969 | Manber | 340/324 AD |
| 3,624,632 | 11/1971 | Ophir | 340/324 AD |
| 3,750,135 | 7/1973 | Carey et al. | 340/324 AD |
| 3,946,365 | 3/1976 | Bantner | 340/324 AD |
| 3,967,268 | 6/1976 | Roberts | 340/324 AD |
| 3,979,742 | 9/1976 | Kolb et al. | 340/324 AD |

*Primary Examiner*—David L. Trafton
*Attorney, Agent, or Firm*—Hane, Sullivan & Spiecens

[57] ABSTRACT

In a cathode ray tube display system, characters are generated for display either as matrices of dots or as sets of strokes on the lines of a parallel horizontal line raster.

2 Claims, 4 Drawing Figures

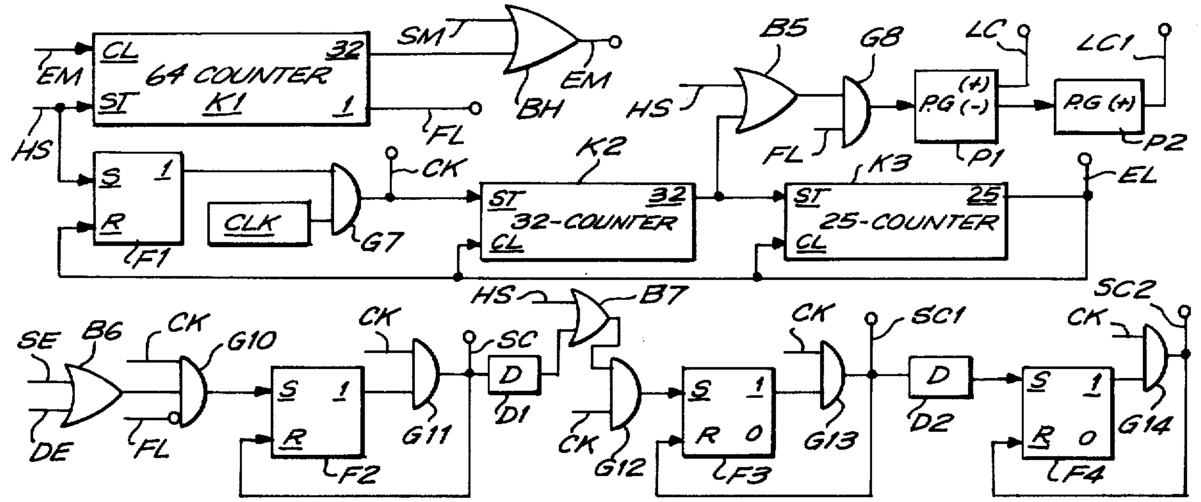
FIG. 2 TIMER TM
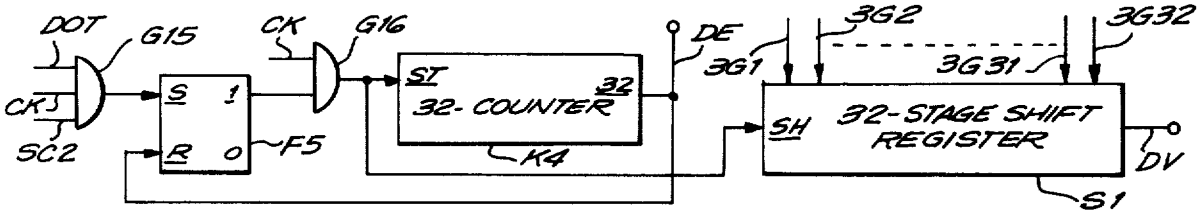
FIG. 3 DOT GENERATOR DG
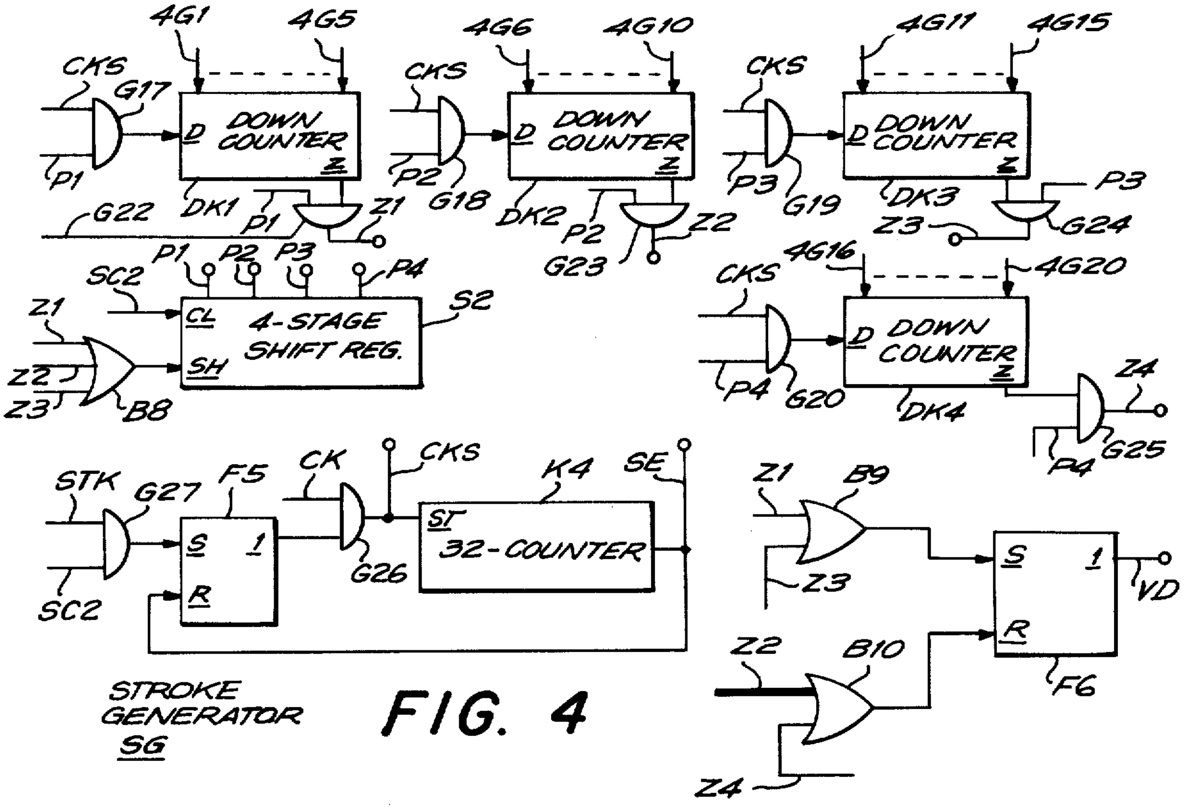
STROKE GENERATOR SG
FIG. 4

DUAL MODE PATTERN GENERATOR

BACKGROUND OF THE INVENTION

This invention pertains to display systems and more particularly to pattern generators using binary techniques.

The pattern generators of conventional display systems using display devices such as cathode-ray tubes fall into two classes, those using vector generators and analog techniques, and those using parallel line rasters and binary modulation techniques.

Of the two classes when, characters are concerned it has been found much more convenient and simpler to use the raster scan/binary modulation schemes. These schemes fall into two major groupings, those representing the characters by dot matrices as shown in U.S. Pat. No. 3,165,045 and those using stroke arrays as shown in U.S. Pat. No. 3,305,841.

When using the dot matrices techniques one can produce characters with very intricate detail. However, the amount of information required (the number of dots) can be considerable whether the character is simple or complex. In order to compress the information required to represent a character, the stroke technique is used. Such a technique indeed does reduce the amount of information needed to represent characters such as the alphanumerics E, 3 and T but requires considerable information to represent characters such as &, %, $ and @.

SUMMARY OF THE INVENTION

It is accordingly a general object of the invention to provide an improved method of representing the characters of a font.

It is another object of the invention to provide a method of representing the characters of a font which exploits the advantages of the dot and stroke schemes while avoiding their disadvantages.

Briefly, the invention contemplates in a display system the method of representing the characters of a font by representing some of the characters by matrix arrays of dots and other characters by sets of strokes arrayed on parallel lines.

DESCRIPTION OF THE DRAWING

Other objects the features and advantages of the invention will be apparent from the following detailed description when read with the accompanying drawing wherein:

FIG. 2 is a logic diagram of the timer of FIG. 1;

FIG. 3 is a logic diagram of the dot generator of of FIG. 1; and

FIG. 4 is a logic diagram of the stroke generator of FIG. 1.

DETAILED DESCRIPTION

Figure 1:
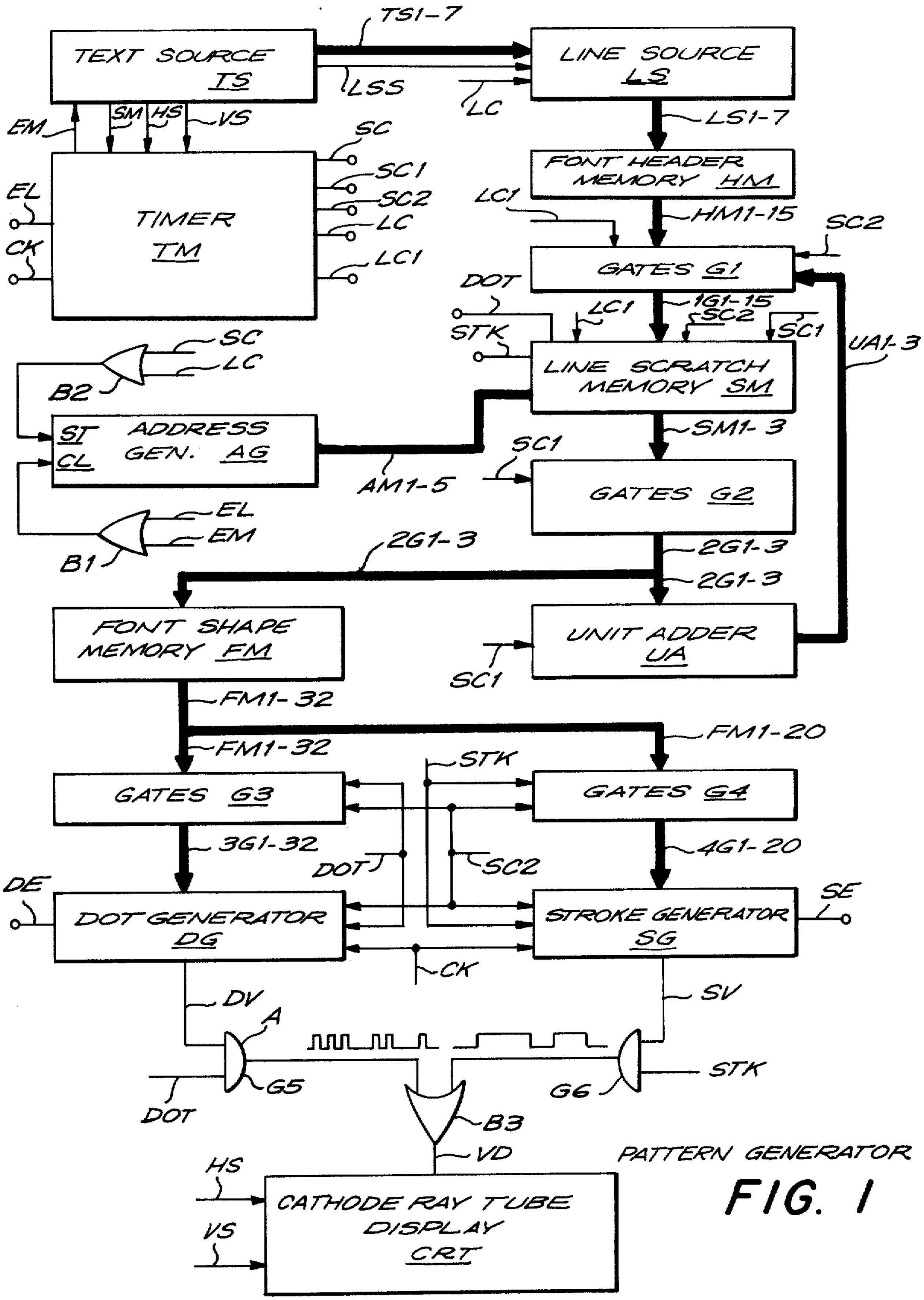
FIG. 1 is a block diagram of a system utilizing the method of the invention.

The system will be described for generating a line of characters on a cathode ray tube display which is driven on a conventional raster scan of a plurality of horizontal lines. It will be assumed merely by way of example that the line of characters will occupy 64 horizontal raster lines.

The horizontal raster lines are assumed to be divided into eight hundred time increments or elements.

It will also be assumed that the width of the characters including left and right space is 32 time increments or elements. Therefore, up to 25 characters can be displayed on a character line.

In FIG. 1 a pattern generator is shown utilizing the invention. The pattern generator comprises: a time TM which generates the overall timing signals for the generator; a text source TS which in response to a signal on line EM from timer TM emits horizontal and vertical synchronizing signals on line HS and VS and seven-bit character codes represented by the binary signals on the seven lines of cable TS1-7; a font header memory HM which has 128 addressable 15-bit registers wherein each register stores a 13-bit starting address, one flag bit to indicate whether the character is generated by dots, and a flag bit to indicate whether the character is generated by strokes; a line source memory LS which can be of the shift register type so that the character codes received on the lines of calbe TS1-7 under control of shift pulses on line LSS from text memory TS are fed via the cable of lines LS1-7 to font header memory HM under control of shift pulses on line LC from timer TM; gates G1, a plurality of AND-circuits which either connect the cable of lines HM1-15 from font header memory HM to cable of lines 1G1-5 under control of signals on line LC 1 from timer TM or connect the cable of the lines UA1-13 to the cable of lines 1G1-15 under control of signals on line SC2 from timer TM; a line scratch memory SM which can be an addressable memory having twenty five storage registers each storing one 15-bit word associated with a character to be displayed and received from gates G1 via lines 1G1-15, and upon selection transmitting a 13-bit starting address of the associated character to the cable of lines SM1-13, a dot indicating bit when present on line DOT and a stroke indicating bit when present on line STK; an address generator AG which can be a unit accumulator which is initialized by signals received on lines EL and EM to OR-circuit B1 and which is unit accumulated by signals on line SC and LC to OR-circuit B2; gates G2 which connect the cables of line SM1-13 to the cable of lines 2G1-13 under the control of signals on line SC1; a unit adder UA which adds binary 1 to the number represented by the signals on the cable of lines 2G1-13 under control of a signal on line SC1 and transfers the bits representing the new number to the cable of lines UA1-13; a font shape memory FM which is an addressable memory having 128 sets of registers, each set being associated with a different character of a font, wherein each set of registers includes 63 registers of the same capacity, either twenty or thirty two-bits, wherein a set of 20-bit registers is associated with a character which is generated by strokes and a set of 32-bit registers is associated with a character which is generated by dots; gates G3 which either connect the cable of lines FM1-32 from font shape memory FM to the cable of lines 3G1-32 under control of the signals on lines DOT and SC2 or connect the cable of lines FM1-20 to the cable of lines 4G1-20; a dot generator DG which in response to the signals on the lines 3G1-32, under the control of signals on lines CK from timer TM and DOT, generates a video signal as a sequence of dot pulses which is fed onto line DV and am end of line signal on line DE; stroke generator SG which in response to the signals on the lines of cable 4G1-20, under control of the signals on lines SC2 and STK generates an off-on video signal on line SV and end of line signals of line SE; AND-circuits G5 and G6 and OR-circuit B3 which selectively connect the signals on lines DV and SV to line VD; and a cathode-ray tube display CRT having a conventional cathode tube which is driven in a conventional horizontal line raster in response to signals on lines HS and VS and whose electrode beam is modulated by signals on line VD.

At the start of operations the text source TS emits a signal SM to timer TM which responds with a signal on line EM. The signal on line EM received by text source TS causes the source TS to shift, via the lines TS1-7 by means of pulses on line LS, the character codes representing the characters to be generated on a character line into line source LS. Sometime thereafter text source TS emits horizontal and vertical sync pulses on lines HS and VS which start the raster in cathode ray tube display CRT. In addition, the pulse signal on line HS, and every such pulse signal initiates the generation of eight hundred clock pulses on line CK, these pulses indicate or time the eight hundred possible time increments or space elements on a raster line. In addition during the first raster line time there is a signal present on line FL. For every 32 clock pulses, a pulse is emitted on line LC followed by a pulse of line LC1. The pulse on line LC shifts a new character code to the output of line source LS. The character code on lines LS1-7 addresses one of the registers of font header memory HM which transfers its 15-bit word onto the lines of cable HM1-14. At the same time, address generator AG accesses the first register of line scratch memory SM so that when the pulse occurs of line LC1, the contents of the selected register of font header memory HM for the first character are loaded into the first register of line scratch memory SM. Each succeeding set of pulses on lines LC and LC1 cause the header information (starting address, and dot and stroke flags) to enter successive registers of line scratch memory SM. At the end of the first raster line the signal on line FL terminates and, the line scratch memory SM has been loaded with the header information for each character of the line of characters which is to be displayed.

At the end of the first raster line and every raster line a signal is generated on line EL.

For the next 63 horizontal raster lines the signals on line SC instead of line LC will step the address generator AG. Note also that the signals on line EL hereafter initialize the address generator which then calls for the first register of memory SM.

It will be assumed that the first character of the character display line whose header information is in the first register of scratch memory SM is to be generated by means of dots. Thus at this time, a signal will be present on line DOT and not on line STK, and the starting address in font shape memory FM for the dot codes for the first row of this first character is present of lines SM1-13. When the first pulse on line SC1 occurs, this starting address is fed to font shape memory FM and to unit adder UA. Font shape memory FM transfers the contents of the register associated with this starting address, the first row of dots of the character, to the inputs of gates G3. Unit adder UA adds one to the starting address and feeds the updated address (associated with the second row of dots of the character) to gates G1. When the pulse of line SC2 which follows the pulse on line SC1 occurs the updated address is returned to this same first register of line scratch memory SM. Also at the time of the pulse on line SC2, gates G3 transfer the information for the first row of dots to dots generator DG via the lines 3G1-32 which generates and transfers the dot pulses for this first line via line DV, AND-circuit G5, OR-circuit B3 and line VD to display CRT. At the end of the first row of dots, dot generator DG emits a signal on line DE to timer TM which generates a signal on line SC.

The signal on line SC increases the address in address generator AG by one, accessing the second register in scratch memory SM. This second register contains the header information for the second character to be displayed which is assumed to be generated by strokes. Therefore, there is a signal on line STK instead of line DOT. During the time of the pulse on line SC1 following the pulse of line SC the starting address of this second character is updated by the unit adder UA and fed back to gates G1 and the address is also used to select from font shape memory FM the stroke information for the first stroke row of this second character. At the occurrence of the pulse on line SC2 following the pulse on line SC1, this stroke row information is fed via gates G4 to stroke generator SG, while at the same time the updated address for the stroke information for the next stroke row of this character is returned via gates G1 to its original register in scratch memory SM.

Stroke generator SG generates a signal which shifts between high-and low- values at times related to the lengths and separations of the strokes. This signal is fed via line SV, AND-circuit G6, OR-circuit B3 and line VD to display CRT which now "paints" the first stroke row of the second character. At the end of generating the stroke row, the stroke generator SG transmits a signal on line SE to timer TM which emits another set of pulses on lines SC, SC1 and SC3 to generate the first row of the third character to be displayed. The first stroke row of third character is handled like that of the first character if it is represented by a dot pattern and like the second character if it is represented by a stroke pattern.

This procedure continues to the end of this second raster line as indicated by another signal on line EL.

When the next signal on line HS occurs starting the third raster line, the whole routine is repeated as described for the second raster line except now scratch memory stores the addresses for the second rows of the characters and these addresses will be updated for the addresses of the third rows of the characters. In this manner the characters are built up raster line-by-raster line on the screen of the display. At the end of the thirty second raster line, timer TM emits a signal on line EM to indicate a complete line of characters has been displayed.

Sometime thereafter text source TS can reload line source LS for another line of characters.

The details of the various blocks will now be more fully described.

Text source TS can be a data processor or the like which should include or operate in parallel with horizontal and vertical sync pulse generators normally used in television transmission. The processor can generate the ASCII codes associated with the characters to be displayed.

Line source LS can be a shift register type memory. In a simple form it can be seven 25-bit shift registers connected in parallel. In such case, when text source TS loads line source LS is must generate 25 shift pulses even if less than 25 codes are loaded into source LS.

Font header memory HM can be read only memory having 128 addressable registers of 14 bits each wherein the ASCII codes are used for the addresses.

Gates G1 can be 13 identical circuits wherein the *n*th typical circuit satisfies the Boolean equation:

$$1Gn = HMn \cdot LC1 + UAn \cdot SC2$$

and two other circuits which satisfy the following Boolean equations $$1G14 = HM14 \cdot LC1$$

$$1G15 = HM15 \cdot LC1$$

Line scratch memory SM can be a conventional random access memory having 25 15-bit registered which are addressed by the signals on lines AM1-5. The write cycles can be initiated by signals on lines LC1, and SC2 and the read cycles initiated by signals on lines SC1.

Gates G2 can be thirteen identical circuits wherein the *n*th typical circuit satisfies the Boolean equation:

$$2Gn = SMn \cdot SC1$$

Address generator AG can be a five stage binary counter having a step terminal ST and a clear terminal CL. The outputs of the stages are connected to the cable of lines AM1-5.

Unit adder UA can be a six position parallel full binary adder whose five augend inputs are connected to lines SM8, SM9 SM10, SM11, SM12 and SM13 of cable SM1-13 assuming line SM13 carries the least significant bit of the address. The least significant addend input is connected to line SC1 while the four more significant inputs are returned to logical zero. The five sum outpus of the adder are connected to lines UA8 to UA13 respectively. Note lines 2G1 to 2G7 are connected respectively to lines UA1 to UA7.

Font shape memory Fm can be a read only memory having 128 sets of registers wherein each set has sixty three registers. If a set is associated with a character which is to be represented by a row of dots then the registers of the set will store 32 bits. If a set is associated with a character which is to be represented by rows of strokes then the registers of the set will store 20 bits (four sets of five bits) if one assumes two strokes and two spaces and any stroke or space can be up to 31 elements long.

Gates G3 can be thirty two identical circuits wherein a typical *n*th circuit satisfies the Boolean equation $$3Gn = FMn \cdot DOT \cdot SC2.$$

The gates G4 are twenty identical circuits wherein a typical *n*th circuit satisfies the Boolean equation $$4Gn = FMn \cdot STK \cdot SC.$$

The cathode ray tube display CRT can be a conventional display having horizontal and vertical drive circuites responsive to H-sync and V-sync signals to generate a multi-horizontal line raster with horizontal and vertical retrace blanking along with a video input to modulate the electron beam.

The timer TM shown in FIG. 2 generates the timing signals for the pattern generator. Timer TM centers around three units, one associated with counting horizontal raster lines, another with generating the 800 clock pulses per raster line as well as strobe pulses on lines LC and LC1 used during the loading of the line scratch memory SM during the first horizontal raster line, and the third associated with the strobe pulses on lines SC, SC1 and SC2 used during the actual generation of the dot and stroke signals. The horizontal line counter K1 comprises a six stage binary counter which counts to 64 and the suitable decoders for decoding a count of one and a count of sixty four. The output for the count of one is connected to line FL and the output for the 64 count is connected to one input or OR-circuit B4 whose other output is connected to line SM. The output of OR-circuit B4 is connected to line EM. The counter K1 has an initializing input CL connected to line EM.

The clock-pulse generator comprises a flip-flop F1 having a set input S connected to line HS and a clear input connected to line EL. The flip-flop is set by a signal on line HS and is cleared eight hundred clock pulses later by a signal on line EL as will now become apparent. The 1-output of the flip-flop F1 is connected to one input of AND-circuit G7 whose other input is connected to a pulse generator CLK which has a repetition rate in the order of 16 Mhz. Thus when flip-flop F1 is set clock pulses are present on line CK connected to the output of AND-circuit G7. The clock pulses are fed to the step input ST of five stage binary counter K2 which modulo counts to thirty two and for every thirty second pulse emits a pulse to the step input ST of five stage binary counter K3 which includes a decoder connected to the appropriate stages to emit a signal on line EL whenever the counter K3 reaches a count of twenty five. The signal on line EL is fed to the clear inputs of counters K2 and K3 to initialize their counts and to clear the flip-flop F1 preparatory to the start of another horizontal raster line. In addition the output of counter K2 is fed to one input of OR-circuit B5 whose other input is connected to line HS. The output of OR-circuit B5 is connected to one input of AND-circuit G8 whose other input is connected to line FL. Thus whenever during the first horizontal scan line either the signal on line HS starts or there is a pulse from counter K2, AND-circuit G8 transmits a positive going transient to the input of pulse generator P1. Pulse generator P1 can be a one shot multivibrator which emits a positive going pulse on its direct output (+) connected to line LC and a negative going pulse on its inverting output (−) whenever it receives a positive going step at its input. The inverting input (−) is connected to the input of pulse generator P2 whose direct output (+) is connected to line LC1. Pulse generator P2 which is similar to pulse generator P1 emits a pulse which starts at the trailing edge of the pulse on line LC.

The last circuit of the timer includes OR-circuit B6 having a first input connected to line SE and a second input connected to line DE. Whenever either the dot generator DG or stroke generator indicate the end of a row of a character, the output of OR-circuit B6 feeds a high signal to one input of AND-circuit G10 whose other inputs are connected to lines CK and FL. Note that the input connected to line FL is an inverting input, therefore for all but the first raster line a clock pulse will be gated through to the output of AND-circuit G10 to the set input S of flip-flop F2 whose output is connected to an input of AND-circuit G11 whose other input is connected to line CK. The output of AND-circuit G11 is connected to delay network D1, to line SC and to the clear input R of flip-flop F2. Thus every time a clock pulse passes through AND-circuit G10 a pulse is transmitted on line SC.

The output of delay network D1 is connected to one input of OR-circuit B7 whose other input is connected to line HS. The output or OR-circuit B7 is connected to one input of AND-circuit G12 whose other input is connected to line CK and whose output is connected to the set input of flip-flop F3. The 1-output of flip-flop F3 is connected to one input of AND-circuit G13 whose other input is connected to line CK. The output of AND-circuit G13 is connected to the line SC1, the clear input R of flip-flop F3 and to the input of delay network D2. Thus whenever the output of OR-circuit B7 goes high a clock pulse is transmitted on line SC1. The output of delay network D2 is connected to the set input of flip-flop F4 whose 1-output is connected to an input of AND-circuit G14. The other input of AND-circuit G14 is connected to line CK and the output is connected to line SC3 and the clear input of flip-flop F4. Thus one clock pulse time after a pulse on line SC there is a pulse on line SC1, and one clock pulse time after a pulse on line SC1 there is a pulse on line SC2.

The dot generator DG comprises a thirty two stage shift register S1 which receives the signals representing the thirty two possible dots of a row from lines 3G1 to 3G32 and shifts these dots as pulses on line DV in response to shift pulses on terminal SH. The shift pulses are transmitted from AND-circuit G16 having one input connected to line CK and another input connected to the 1-output of flip-flop F5. The set input S of the flip-flop F5 is connected to the output of AND-circuit G15 having inputs connected to lines CK, DOT and SC2. The output of AND-circuit G16 is connected to five stage binary counter K4 which include means for decoding a count of 32 to emit a pulse on line DE which also is connected to the clear input of flip-flop F5. Thus when 32 clock pulses pass through AND-circuit G16 counter K4 emits a pulse on line DE and the shift pulses terminate until restarted by the next character.

The stroke generator SG shown in FIG. 4 converts the four five-bit binary numbers of a stroke row into a signal which switches between low and high to create up to two strokes in a character row. The first five-bit binary number which is associated with the distance from the start of the character region to the start of the first stroke is represented by signals on lines 4G1, to 4G5 and is loaded into down counter DK1. Down counter DK1 is a conventional five-stage up-down counter set to the down count mode which will unit decrement in response to pulses from the output of AND-gate G17 whose inputs are connected to lines CKS and P1. The counter can have a decoder which emits a signal on terminal Z when zero is stored. Terminal Z is connected to one input of AND-circuit G22 whose other input is connected to line P1. The second five-bit binary number usually associated with the first stroke is loaded from lines 4G6 to 4G10 into down counter DK2 which is similar to counter DK1. Down counter DK2 is decremented by pulses from AND-gate G18 having inputs connected to lines CKS and P2 and emits a signal on terminal Z when zero is stored. Terminal Z is connected to one input of AND-circuit G23 whose other input is connected to line P2. The third five-bit binary number usually associated with the space between the first and second strokes is loaded from lines 4G11 to 4G15 into down counter DK3 which is similar to down counter DK1. Down counter DK3 is decremented by pulses from the output of AND-circuit G19 which has inputs connected to lines CKS and P3 and emits a signal on terminal Z when storing a zero count. Terminal Z is connected to one input of AND-circuit G25 whose other input is connected to line P3. The fourth five-bit number usually associated with the second stroke of a row is loaded from lines 4G16 to 4G20 into down counter DK4 which is similar to down counter DK1. Down counter DK4 is unit decremented by pulses from the output of AND-circuit G20 which has inputs connected to lines CKS and P4, and emits a signal on terminal Z when containing a zero count. Terminal Z is connected to one input of AND-circuit G25 whose other input is connected to line P4.

The decrementing pulses are from line CKS which is connected to the output of AND-circuit G26 having inputs connected to line CK and the 1-output of flip-flop F5. The set input of the flip-flop F5 is connected to output of AND-circuit G27 having inputs connected to lines STK and SC2. The CKS signal line is connected to the step input of five stage binary counter which can have a decoder to indicate the counts of 32. The output of the decoder is connected to line SE. The clearing input R of the flip-flop F5 is connected to line SE. Thus thirty two clock pulses are present from the start to the end of the character row.

The sequencing of the counting down of the four down counters is controlled by the sequential occurrence of the signals on lines P1, P2, P3 and P4 as controlled by the four stage shift register S2. The outputs of the stages are connected to lines P1 to P4. The register S2 is cleared to the first stage to generate a signal on line P1 by a signal on line SC2 connected to the CL input of the shift register. Shifting is accomplished by pulses from the output of OR-circuit B8 connected to shift input SH. The inputs to the OR-circuit B8 are connected to the Z1, Z2 and Z3 signal lines. Thus when down counter DK1 is decremented to zero during P1 time the signal on line Z1 steps shift register S2 to its second stage giving a signal on line P2 to start the decrementing of down counter DK2. Similarly for down counters DK3 and DK4.

Video flip-flop F6 generates the video signal fed to line VD, the 1-output being connected thereto. The set input S of the flip-flop F6 is connected to the output of OR-circuit B9 having inputs connected to lines Z1 and Z3. The clear input is connected to the output of OR-circuit B10 having inputs connected to lines SC2, Z2 and SE. The flip-flop is initially cleared by a signal on SC2 at the start of a row. When counter DK1 has counted down the signal on line Z1 sets the flip-flop for the first stroke. When the counter DK2 has counted down the signal on line Z2 clears the flip-flop to end the first stroke. When the counter DK3 has counted down the signal on line Z3 sets the flip-flop to start the second stroke. When the counter DK3 has counted down the signal on line 24 clears the flip-flop to end the second stroke. Note each character is thirty two clock pulses in duration. It is possible for all thirty two clock pulses to be used in counting down say counter DK1 and the row will have no strokes. It is possible for the thirty two clock pulses to be used in counting down counters DK1, DK2 and DK3, then the row will have only one stroke. However, such character rows can have at most two strokes. If more strokes are required, then the character is generated by means of dots.

Thus, there has been shown a pattern generator which takes advantage of the data compression realized from stroke generators but at the same time can exploit the fine detail associated with dot generators.

While only one embodiment of the invention has been shown and described in detail, there will now be obvious to those skilled in the art many modifications and variations satisfying many or all of the objects of the invention. For example, the geometry of the characters, i.e., the number of horizontal rows and elements per row as well as the number of characters per line is merely representative and not limiting. The text source can take many other forms such as keyboards and editors. The display can be remote, and the video output of the pattern generator can be superimposed on other video information in a television studio before transmission.

What is claimed is:

1. In a display system, the method of representing the characters of a font by representing some of the characters of the font by matrix arrays of dots wherein each row of the matrix is stored as a combination of bits in one-to-one correspondence with the presence of dots in the row of the matrix and representing other characters of the font by sets of strokes disposed on a group of parallel lines wherein the length of each stroke is stored as a number in the form of a coded combination of bits.

2. The method of claim 1 of assigning to each character indicium indicating whether the character is represented by a matrix array of dots or a set of a plurality of strokes.

* * * * *